United States Patent Office 3,300,281
Patented Jan. 24, 1967

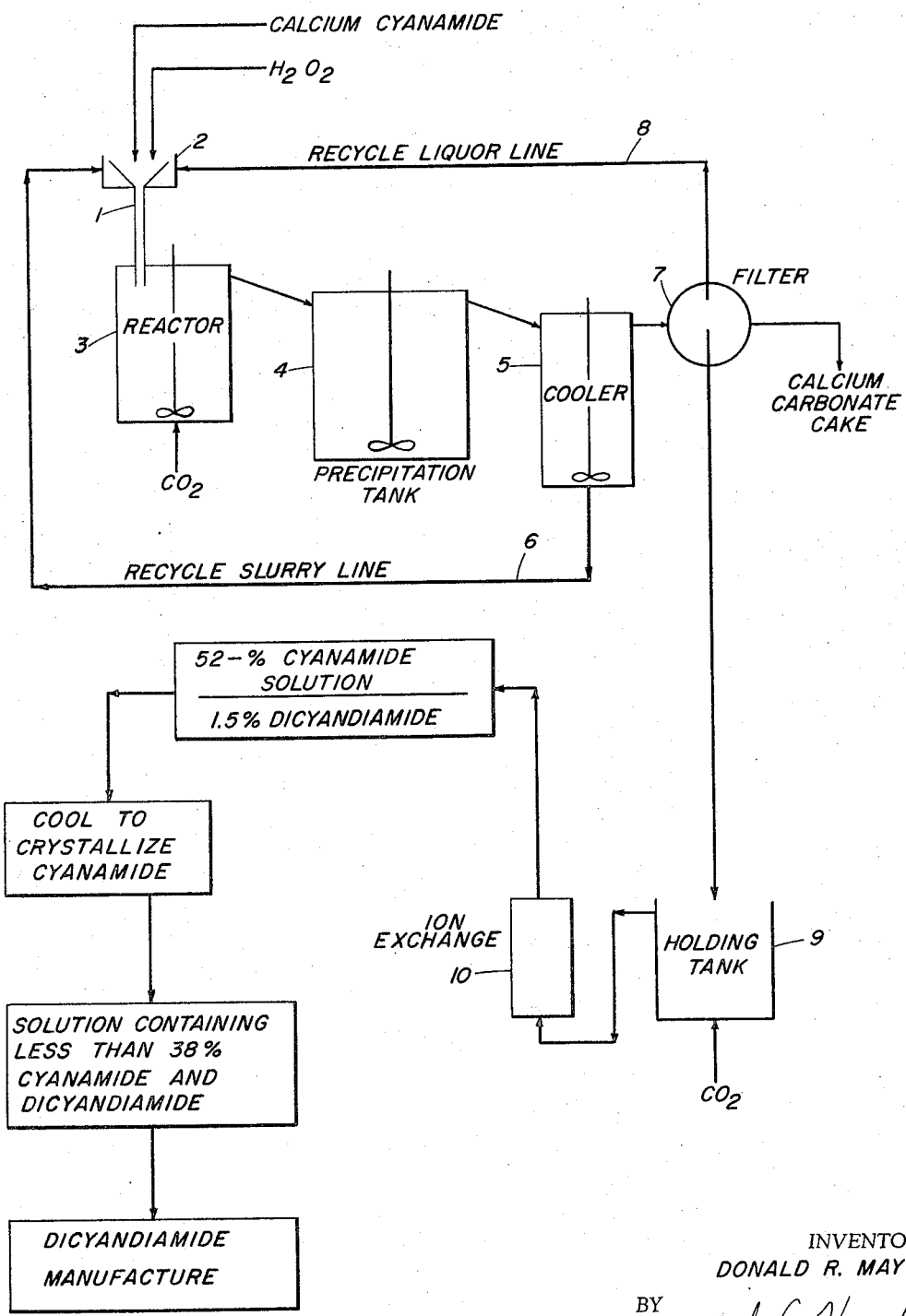

3,300,281
METHOD FOR MANUFACTURE OF CYANAMIDE
Donald R. May, Niagara Falls, Canada, assignor to American Cyanamid Company, Stamford, Conn., a corporation of Maine
Filed Aug. 6, 1965, Ser. No. 477,905
3 Claims. (Cl. 23—190)

This application is a continuation-in-part of application Serial No. 261,322, filed February 27, 1963 and now abandoned.

The present invention relates to a process for the manufacture of concentrated cyanamide solutions and to an integrated process for manufacturing concentrated cyanamide solutions and dicyandiamide. More particularly, it relates to a process for the manufacture of concentrated aqueous cyanamide solutions of high purity having a sufficiently high cyanamide concentration, to permit the recovery of substantially pure crystalline cyanamide therefrom and the integration of such a process with a dicyandiamide process.

Aqueous cyanamide solutions are prepared on a commercial scale by the continuous carbonation of calcium cyanamide in water in accordance with the over-all equation:

$$CaNCN + H_2O + CO_2 \rightarrow H_2NCN + CaCO_3\downarrow$$

and recovering the solution from the precipitated calcium carbonate and other insoluble impurities.

Such solutions normally contain about 25% cyanamide.

In addition to the over-all reaction set forth in the equation above, various side reactions occur, including those which result in the formation of dicyandiamide, urea and thiourea. The equations which illustrate these reactions are set forth below:

(1) Formation of dicyandiamide

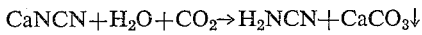

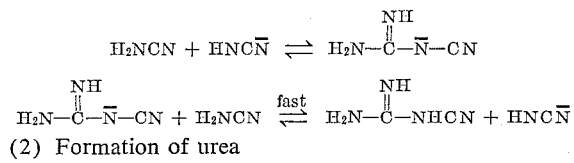

(2) Formation of urea

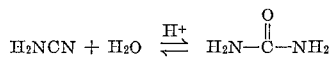

(3) Formation of thiourea (from sulfur impurity in industrial-grade calcium cyanamide)

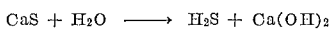

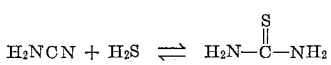

In producing aqueous cyanamide solutions, industrial grade calcium cyanamide is continuously dissolved in a circulating slurry of cyanamide solution in a mixer and then fed to a carbon dioxide gas absorber for carbonation. A portion of such a slurry is continuously returned to the mixer while the remainder is filtered to produce cyanamide solution and waste carbonate filter cake. Additional water is introduced into the system from the wash water employed in the filtering, and concentration of the final solution has heretofore been carefully controlled by the degree of dilution resulting from the use of such water.

The concentration of freshly prepared cyanamide solutions, i.e., solutions which have not been concentrated, as by vacuum concentration, are normally about 25%. Higher concentrations have not been prepared, as they are known to increase the rate of dicyandiamide formation, which reduces the stability of the system.

Processes of the general type described produce products typically containing 25% of cyanamide, 2.5 to 5% of dicyandiamide, 0.5 to 1% thiourea, and lesser amounts of other nitrogeneous impurities, particularly urea, and dissolved calcium carbonate present to the extent of 1000 to 2000 parts per million. Such solutions are fairly stable as long as the pH is maintained between 4 and 6. At pH levels above 6, cyanamide begins to dimerize to dicyandiamide in accordance with Equation 1 above. At pH levels below 4, cyanamide hydrolyzes to urea in accordance with the Equation 2 above.

It is known from the phase diagram for the binary system, cyanamide-water, that cyanamide cannot be crystallized from aqueous solutions containing less than about 38% of cyanamide. Thus, processes for the preparations of crystalline cyanamide based on aqueous solutions having cyanamide concentrations of less than about 38% have relied on means such as vacuum evaporation to increase the concentration of the solution to a point where cyanamide can be crystallized out. However, vacuum concentration of cyanamide solutions has caused explosions due to the tendency of the cyanamide solutions to become alkaline during evaporation.

According to U.S. Patent No. 2,982,616, this tendency for the pH to increase is associated with the presence of a small amount of calcium salts, mainly calcium carbonate present in the cyanamide solution. The method there disclosed is said to be a safe method for the production of crystalline cyanamide by evaporating dilute aqueous cyanamide solutions and comprises ion exchanging out the calcium content to below a critical level, prior to employing evaporation procedures. The purity of the product produced by the process disclosed in this patent is limited, since the dilute solution contains significant amounts of dicyandiamide, which is concentrated by evaporation and crystallizes with the cyanamide because of its relatively low solubility. In the examples given, product purities range from 92 to 96%. Higher purities were obtainable only by recrystallization from ether and benzene.

It would obviously be a significant advance in the art of cyanamide manufacture if a process could be devised whereby concentrated aqueous cyanamide solutions, i.e., aqueous solutions containing from above about 38% and normally from about 38 to 75% cyanamide could be readily prepared, and from which substantially pure cyanamide could be readily crystallized.

In general, in the manufacture of cyanamide the formation of dicyandiamide is undesirable in that its formation results in a lower yield of the prepared cyanamide. It obviously would be most advantageous if a process could be devised which would in effect take advantage of the presence of dicyandiamide in concentrated cyanamide solutions in such a way as to render the over-all concentrated cyanamide solution process more economical and at the same time result in improved purity of the concentrated cyanamide solutions and crystalline cyanamide derived therefrom.

Accordingly it is an object of the present invention to provide a process for the preparation of concentrated aqueous cyanamide solutions from which solid cyanamide may be readily crystallized, which is substantially free of dicyanamide, urea and thiourea.

It is a further object of the present invention to provide a simple and direct process for producing concentrated aqueous cyanamide solutions of high purity from which solid cyanamide of high purity, i.e., a purity greater than 96% and usually 99% and higher, may be readily obtained.

It is a still further object of this invention to provide an integrated process for manufacturing concentrated cyanamide solutions and dicyandiamide which results in a more economical process for the manufacture of cyanamide and at the same time results in concentrated cyanamide solutions of improved high purity as well as crystalline cyanamide of improved high purity derived therefrom.

These and other objects and advantages of the present invention will become more apparent from the detailed description thereof set forth hereinbelow.

In accordance with the present invention, a new process is provided which offers a safe means for producing directly in the freshly prepared state, that is, without the necessity of employing procedures such as evaporation, aqueous cyanamide solutions of sufficiently high concentration, i.e., a concentration higher than about 38%, and sufficiently low impurity level that cyanamide of 96% and, if desired, greater than 99% purity can be readily recovered from the solution by cooling such concentrated solutions to almost the cyanamide-water eutectic at about 16.5° C. (between about −16 and −17° C.) to crystallize out the solid cyanamide.

The high purity concentrated cyanamide solutions produced in accordance with one process aspect of the present process and the high purity solid cyanamide derived therefrom greatly enhance cyanamide's function as a chemical intermediate.

In general, the process involves the discovery that by carefully controlling a number of seemingly mutually dependent process variables and reaction conditions in a continuous process that at steady state high concentrated cyanamide solutions may be prepared directly and in high purity.

First, the process involves the continuous carbonation of calcium cyanamide in aqueous medium under conditions which are unfavorable for the dimerization of cyanamide to dicyandiamide. It has been determined that the dimerization of cyanamide occurs most readily under the high pH conditions that are prevalent in the mixing vessel and pipe lines where calcium cyanamide is introduced and dissolved in a recirculating cyanamide slurry prior to entering the reactor.

In accordance with this process aspect of this invention, calcium cyanamide and recirculated cyanamide slurry are mixed and carbonated substantially simultaneously. This may be accomplished by mixing said calcium cyanamide and slurry just prior in time to carbonation or while feeding them directly to the reactor. A suitable device for conveniently carrying out this simultaneous mixing and carbonation will be described more fully hereinafter in connection with the accompanying drawing and example.

Second, a high recycle recirculation rate is maintained, including slurry from a point in process after the reaction but before filtration and wash liquor from the filtering means.

By high recirculation rate as that term is employed it is meant that at steady state the total amount of cyanamide slurry and recycle liquor relative to the amount of fresh calcium cyanamide fed to the reactor is from 50 to 150 to 1 on a weight basis.

The components of the recirculated material, i.e., the slurry and the liquor, are preferably employed in a ratio of from 10 to 20 to 1 slurry to liquor, and the slurry at steady state is preferably one having a suspended solids content of from 15 to 35%.

By maintaining a high recycle recirculation rate as described, the pH in the reactor is more readily maintained at steady state at a pH level which minimizes dicyandiamide formation, and results in the build-up at steady state of high cyanamide concentration solutions.

Thirdly, the temperature in the reactor and other equipment employed prior to the filtering means is maintained at temperatures of from about 10 to about 25° C. and at a pH of from about 6 to about 7.5. The reactor temperature is preferably controlled at a temperature of from about 20 to about 25° C. with refrigeration if necessary and the pH is carefully controlled at a range of from about 6.3 to 7.3.

By employing the conditions set forth above, dimerization is sufficiently low that it is possible to produce a concentrated aqueous cyanamide solution containing above about 38% and up to 75% of cyanamide with as little as 1% of dicyandiamide.

A fourth aspect of the present process entails the use of an oxidizing agent such as hydrogen peroxide to precipitate sulfur normally found in industrial calcium cyanamide. The precipitation of sulfur prevents the formation of thiourea as an impurity in the final product. The amount of oxidizing agent employed should normally be sufficient to precipitate all the sulfur present in the calcium cyanamide and is preferably introduced into the reactor with the calcium cyanamide and recycle liquor and slurry.

The above-described interdependent process variables are specific for my continuous process for the manufacture of concentrated aqueous solutions of cyanamide where it is desirable if not essential to maintain a low percent of dicyandiamide in said solution.

In my integrated process referred to above wherein a process for preparing concentrated aqueous cyanamide solutions is integrated into or combined with a dicyandiamide manufacturing process, I have discovered that the process conditions employed in the manufacture of the concentrated cyanamide solutions can be relaxed considerably, and yet provide a process that actually produces in a continuous manner cyanamide solutions of higher purity than those that can be produced by the non-integrated procedure.

Thus, time, temperature and pH ranges can be broadened considerably in view of the fact that the concentrated cyanamide solutions can tolerate higher dicyandiamide content. However, the conditions should be such that the dicyandiamide concentration does not exceed its solubility level in the cyanamide-water eutectic composition, for if this occurs co-crystallization results and cyanamide crystals contaminated with dicyandiamide are obtained when solid cyanamide is recovered.

Ordinarily in the manufacture of dicyandiamide a cyanamide solution having a concentration of 25 to 30% is fed to the dicyandiamide unit where it is converted to dicyandiamide in accordance with Equation 1 above.

In accordance with this process, a cyanamide solution of intermediate strength, i.e., above the 38% concentration required to precipitate crystalline cyanamide from but below about 75% is employed. Thus, as described in the non-integrated process, crystalline cyanamide is extracted by cooling until the concentration falls below 38% and then this cyanamide solution which contains the dicyandiamide is sent to the dicyandiamide plant.

As noted above, the process conditions of temperature and pH may be varied over a broader range of limits than those contemplated for the non-integrated process.

Thus, for example, the temperature may be varied from 0 to 35° C., though preferably it is maintained at from 20 to 25° C.

The pH of the reactor and other equipment may be maintained at a value of 3 to 9, though preferably at a pH of 6 to 7.5. As noted above, these and other conditions can be varied so long as the dicyandiamide concentration does not increase above its solubility level in the cyanamide-water eutectic composition.

In order to more readily understand the processes of this invention, reference will be made herein to the accompanying drawing, the single figure of which is a flow diagram which illustrates the processes of this invention.

As indicated above, calcium cyanamide and recycle cyanamide slurry and liquor are mixed and reacted substantially simultaneously in the reactor by employing a device such as will reduce the residence time of the calcium cyanamide and cyanamide slurry under unstable conditions to a minimum.

Illustratively, this may be done by employing a conical funnel 1 with an annular slurry trough 2 around its rim, which funnel is mounted directly on the reactor 3.

The reactor 3 is maintained at a temperature of from 20–25° C. and a pH of 6.3–7.3 at steady state by the proper maintenance of feed rates to the reactor.

The reactor 3 is equipped with overflow means to a precipitation tank 4 where the cyanamide slurry having a pH of 6.3 to 7.3 is held at a temperature of from 20 to 25° C. for a time sufficient to allow the precipitation reaction to progress toward completion so that the cooling surfaces in the cooler following do not quickly become fouled by precipitating calcium carbonate.

From the precipitation tank 4 the cyanamide slurry is fed to a cooler 5 where the pH has dropped to between 6.3 and 6.7 and a value less than the pH of the reactor and the temperature is adjusted to between 15 and about 20° C., also a temperature less than that of the reactor.

From the cooler 5 a cyanamide recycle slurry line 6 connects annular trough 2 and the cooler, said recycle line being sufficient to carry recycle slurry at a rate of from 50 to 150 to 1 on a weight basis, slurry to fresh calcium cyanamide feed.

From the cooler a portion of cyanamide solution having a cyanamide content of from about 38% to about 75% is fed to a filter 7 where most of the calcium carbonate is removed as waste filter cake at from 50 to about 80% solids, and a dilute recycle solution, resulting from wash water added to the filter (having a cyanamide content of from between 35 and 70%) is fed through recycle liquor line 8 to the annular trough 2 to the mixing funnel 1. The effluent cyanamide solution containing from between about 38% and about 75% or higher cyanamide and between 250 and 1000 p.p.m. based on total solution weight of dissolved calcium is then fed to a holding tank 9 where it is preferably subjected to mild carbonation or carbon dioxide treatment to maintain stable pH conditions while the precipitation reaction progresses still further to reduce the calcium content. Normally, retaining the solution in the holding tank for 1 to 2 hours after carbonation will reduce the calcium level to 150 to 200 p.p.m. If a calcium-free solution is desired, it may be ion exchanged by passing it in contact with a suitable ion exchanger 10. The resulting solution is a concentrated cyanamide solution containing from about 38 to about 75% by weight of cyanamide and up to about 1.5% of dicyandiamide.

In order to reduce or eliminate the thiourea content in the final concentrated cyanamide solution and crystalline cyanamide formed therefrom, which content normally will be an amount of from between .5 to 1%, hydrogen peroxide may be introduced with the calcium cyanamide into the process in proportion to the amount of sulfur in the calcium cyanamide introduced. With such treatment, concentrated cyanamide solution or solid cyanamide containing as little as 0.01 to 0.05% of thiourea can be produced.

It should be noted that only where the concentrated cyanamide solution is to be used as such is it important to add hydrogen peroxide in order to reduce the thiourea content. Thus, when the concentrated solution is to be employed primarily as a source of solid cyanamide, peroxide need not be added. This is so, since thiourea does not precipitate out with the crystalline product, but remains in the mother liquor, which in the integrated process, could be fed to the dicyandiamide manufacturing unit.

In the integrated process, solid cyanamide is crystallized from the concentrated solution produced in the manner described by cooling the solution almost to its eutectic point, as shown in the drawing. Since the cyanamide-water eutectic begins to solidify at about 16.5° C., the maximum yield of pure crystalline cyanamide is obtained by cooling to a point just above this temperature. For solutions initially containing 50 to 60% cyanamide, between 40 and 60% of the cyanamide can be recovered by crystallization, the exact amount depending upon the initial concentration. The crystalline solid cyanamide filtered from the mother liquor will contain less than .4% dicyandiamide and normally will be substantially free of dicyandiamide and less than .1% of other impurities. The mother liquor, which contains not less than about 38% cyanamide and substantially all of the dicyandiamide, may be utilized for other purposes or recycled back into the process, as for example, into the reactor, though in the integrated process it is fed directly to a dicyandiamide manufacturing process.

In the above-described process the rate of feed, the concentration in the recycle slurry and recycle liquor line, the holding times and overflow rate from the reactor, precipitation tank, and cooler are all maintained at steady state to produce concentrated solutions within the meaning of this invention.

In order to illustrate the present invention, the following example is given primarily by way of illustration. No specific details or enumerations contained therein should be construed as limitations on the present invention except insofar as they appear in the appended claims. All quantities are in pounds for an hour operation of steady state.

*Example*

The present example will be described with reference to the accompanying drawing, which is a flow diagram.

100 pounds per hour of industrial grade calcium cyanamide containing 67% calcium cyanamide, 11.5% of calcium oxide, 12.6% of free carbon, 0.8% of calcium sulfide and about 8% metallic oxides, nitrides, etc., are fed with one pound per hour of 35% hydrogen peroxide to conical funnel 1, equipped with annular funnel 2, which is connected or mounted directly onto the reactor 3 so that the leg of the funnel extends below the slurry level of the reactor. Sixty (60) pounds per hour of carbon dioxide is fed to the reactor 3 where the temperature is maintained at 25° C. and the pH is maintained at 7. From the reactor a cyanamide slurry is fed at regulated rate to the precipitation tank 4 by suitable overflow means, and from there to the cooler 5 by suitable overflow means. The pH in the precipitation tank drops to about 6.8 and the temperature is about 25° C. and the pH of the cooler is dropped to about 6.5 at a temperature maintained at 20° C. by means of refrigeration. The desired pH values are achieved and maintained by the relative feed rates of calcium cyanamide and carbon dioxide and by a high recirculation of slurry. Withdrawn from the cooler 5 a high solids (20% solids) cyanamide slurry is recycled through slurry recycle line 6 to slurry trough 2 at the rate of 7200 pounds per hour. This recycle of high solids slurry of controlled temperature and pH together with the amount of wash water added is the principal means for achieving a high concentration of cyanamide solution in the system at steady state.

By suitable overflow means, 625 pounds per hour of cyanamide slurry containing 58% cyanamide on a solids-free basis is fed to a suitable filter 7 such as a rotary vacuum filter and wash water at a rate of 85.7 pounds per hour is employed in washing the filter cake. 178 pounds per hour of waste carbonate filter cake at 70% solids is removed from the filter and 476 pounds per hour of recycle liquor having a cyanamide content of less than 52% is removed from the filter and delivered to slurry trough 2 through recycle liquor line 8 to be mixed with the high solids slurry from the cooler 5 and with the freshly introduced industrial calcium cyanamide. 56 pounds of product per hour, containing about 500 parts of dissolved calcium, are delivered from the filter to a holding tank 9 where further standing with mild carbonation through the introduction of carbon dioxide is employed to reduce the calcium content to a level of from between 150 and 250 parts per million. From the holding tank a high solids cyanamide solution containing 52% of cyanamide may optionally be fed to an ion exchanger 10 to exchange out residual calcium.

The resulting product at steady state was about 56 pounds per hour of cyanamide solution containing 52% cyanamide and 1.5% of dicyandiamide.

Example 1 resulted in a material balance of 82% yield of cyanamide with a 2.4% loss due to dimerization and a 15% loss in filter cake. The filter cake loss may be readily reduced to 2% or less by employing two or more stages of filtration.

The solution was then cooled to a temperature of almost $-16.5°$ C. and solid cyanamide crystals containing less than .2% dicyandiamide and less than .05% thiourea were obtained.

The resulting effluent, which contains not less than 38% of cyanamide and substantially all of the dicyandiamide, is then fed to the dicyandiamide manufacturing facilities, where the cyanamide is dimerized.

What is claimed is:

1. A continuous process for preparing concentrated solutions of cyanamide, crystalline cyanamide and dicyandiamide, which comprises continuously preparing an aqueous cyanamide solution having a cyanamide solids content greater than 38% and having a dicyandiamide concentration below its solubility level in the eutectic composition by reacting calcium cyanamide with carbon dioxide in the presence of an aqueous recycled cyanamide solution containing suspended calcium carbonate and at a pH within the range of about 6 to about 7.5, reducing the temperature to about the eutectic point of the composition to precipitate out substantially pure crystalline cyanamide, recovering said crystalline cyanamide, and dimerizing the cyanamide in the resulting cyanamide solution, which solution contains substantially all of the dicyandiamide resulting from the cyanamide manufacture, to dicyandiamide and recovering said dicyandiamide.

2. In a continuous process for preparing concentrated solutions of cyanamide employing a reactor, a cooler and a filter, the improvement which comprises continuously mixing and reacting substantially simultaneously in said reactor a composition comprising calcium cyanamide, high solids cyanamide slurry continuously being recycled from said cooler, recycle liquor continuously being recycled from said filter, the amount of said slurry being from 10 to 20 times the amount of said recycle liquor and the combined amounts of slurry and liquor being from 50 to 150 times the amount of calcium cyanamide feed, and carbon dioxide, in amounts and under conditions such that a temperature of less than about 25° C. and a pH of between about 6 and 7.5 are maintained during mixing and carbonation to form at steady state a high solids cyanamide slurry containing cyanamide and calcium carbonate, cooling said high solids slurry, withdrawing a portion of said slurry, filtering said portion, the filtrate of which comprises a high concentration cyanamide solution containing above about 38% cyanamide, and withdrawing a portion of said high concentration cyanamide solution.

3. In a continuous process for preparing concentrated solutions of cyanamide, crystalline cyanamide and dicyandiamide employing a reactor, a cooler and a filter, the improvement which comprises continuously mixing and reacting substantially simultaneously in said reactor a composition comprising calcium cyanamide, high solids cyanamide slurry continuously being recycled from said cooler, recycle liquor continuously being recycled from said filter, and carbon dioxide, in amounts and under conditions such that a temperature of less than about 25° C. and a pH of between about 6 and 7.5 are maintained during mixing and carbonation to form at steady state a high solids cyanamide slurry containing cyanamide and calcium carbonate, cooling said high solids slurry, withdrawing a portion of said slurry, filtering said portion, the filtrate of which comprises a high concentration cyanamide solution containing between about 38 and 75% cyanamide, withdrawing a portion of said filtrate, reducing its temperature to about its eutectic point and recovering therefrom crystals of solid cyanamide of high purity, and dimerizing to dicyandiamide the cyanamide remaining in the mother liquor.

References Cited by the Examiner

UNITED STATES PATENTS 2,337,488  12/1943  Osborne _____ 23—190

FOREIGN PATENTS 121,721  7/1943  Australia.
606,568  8/1948  Great Britain.
883,319  11/1961  Great Britain.

OSCAR R. VERTIZ, *Primary Examiner.*

J. J. BROWN, *Assistant Examiner.*